3,185,738
PREPARATION OF META-DINITROBENZENE BY A TWO-STAGE NITRATION PROCESS
Karl F. Cossaboon, Jr., Claymont, Del., and George M. Eyerman, Carney's Point, N.J., assignors to E. I. du Pont de Nemours and Company, Wilmington, Del., a corporation of Delaware
No Drawing. Filed Nov. 1, 1962, Ser. No. 234,879
3 Claims. (Cl. 260—645)

This invention relates to a process for the manufacture of m-dinitrobenzene.

Benzene can be directly nitrated by reaction with nitric acid. As carried out in practice, concentrated sulfuric acid is usually mixed with the nitric acid to take up the water produced in the reaction, thus preventing dilution of the nitric acid. In this art, such a mixture of sulfuric and nitric acid is known as mixed acid; the benzene is known as the organic substrate; and the nitrated benzene is referred to as nitrobody.

The reaction of benzene and nitric acid to produce mononitrobenzene proceeds readily at room temperature. However, the introduction of a second nitro group into the benzene ring has required a higher temperature and a more concentrated mixed acid than is needed for the introduction of the first nitro group. As might be expected, dinitration of benzene with mixed acid results in the production of the ortho and para isomers as well as meta-dinitrobenzene. Moreover, oxidation products are also formed in the reaction, and the yield of dinitrobenzene suffers accordingly. When the meta isomer is the desired end product, it has been the practice to use a batch process since reaction rates are very slow after 90% conversion of the benzene, thus requiring long reaction times to accomplish further conversion. It has also been the practice to keep the reaction temperature as low as possible, since this reduces the proportion of ortho and para isomers in the end product. On the other hand, low temperatures are undesirable since they decrease the rate of reaction. Each 10° C. decrease in temperature cuts the reaction rate by approximately one-half. Thus, in prior art processes it has been necessary at some stage of the operation to maintain the reaction mass at 80° C. or higher for at least an hour, and more often for several hours, in order to obtain appreciable yields of dinitrobenzene. In such processes, the yield of m-dinitrobenzene is usually never more than 85%.

The present invention provides a multi-stage, low-temperature process in which benzene may be continuously dinitrated with a sulfuric acid-nitric acid mixture at a very fast reaction rate to give unusually high yields of the meta isomer. This multi-stage process combines the features of a very low reaction temperature of 5–40° C. and the use of a critical mixed acid concentration and a critical amount of this acid in the later reaction stages. Under these conditions, the m-dinitrobenzene is obtained from the process in the form of a slurry in partially reacted acid, whereupon it may be separated from the acid by filtration or other conventional separation means. The use of such a slurry overcomes the problems of prior art processes where the nitrobody has a tendency to plate out on the cooling surface and interfere with the removal of heat from the reaction zone.

In the process of this invention, benzene is contacted one or more times with the mixed acid at 5–40° C. The contact of the benzene with the mixed acid results in the partial conversion of the benzene to m-dinitrobenzene and also the formation of mononitrobenzene. The mixed acid used in this stage is a three-component mixture of sulfuric acid, nitric acid, and water in which sulfuric acid will constitute 60–85% by weight of the mixture; nitric acid, 2–30% by weight of the mixture; and water, 5–25% by weight of the mixture. The amount of acid used is not critical so long as there is a sufficient amount present for easy handling of the reaction mixture. After contact with the mixed acid for a period which may run from 5 to 60 minutes, the spent acid is separated from the nitrobody, and then in the second phase of the process, the nitrobody is contacted one or more times with a stronger mixed acid in which the composition by weight is as follows: 50–90% sulfuric acid, 10–50% nitric acid, and 0–15% water. In a preferred embodiment of this invention, the water content of the acid in the second phase is 2% to 5%, with an acid containing about 2% especially preferred. A preferred concentration of acid is 80% sulfuric and 20% nitric. The temperature of operation of the second phase is also 5–40° C. The time of contact is usually from about 5 to 60 minutes. However, it is readily understood by one skilled in the art that the period of contact with the acid used in this invention will vary depending upon the size of the reactor, the quantities being reacted, and the particular type of equipment used. When the process reaches the stage where there is about a 50% conversion to m-dinitrobenzene, a slurry begins to form, and at approximately 75% conversion, the volume ratio of acid to the organic components becomes critical, since at this point the amount of acid must be controlled to maintain the m-dinitrobenzene in the form of a slurry. A volume ratio of acid to organic of about 3:1 will accomplish this when there is little or no water present in the acid. If there is an appreciable amount of water, the solvent action of the acid on the m-dinitrobenzene is less, and therefore a volume ratio of acid to organic material of 4:1 is recommended. The upper limit on the amount of acid is not especially critical. However, the use of excessive acid will cause more of the meta-dinitrobenzene end product to be dissolved, and thus it will have to be recovered from the acid by means other than filtration. Sufficient acid should be present to keep the slurry in an easily flowable state, but of course one should not add acid to the point where it converts the slurry to a solution. Usually, the maximum ratio of acid to organic material is 8:1. When the amount of acid is kept within these limits and when the concentration of the acid is as specified above, there is no problem in having sufficient nitric acid present for reaction with the benzene. Although the reaction can be carried out within the range of 5–40° C., temperatures within the range of 30–35° C. are preferred. The temperature of nitration in the process of this invention may be kept constant. There is no necessity for raising it to achieve complete conversion.

The process of this invention is particularly suited for a continuous operation. In such an operation, partially spent acid from the second stage can be used in the earlier stage as mixed acid.

The solid dinitrobenzene product is filtered by any convenient means in conventional apparatus. The spent acid from the first stage is extracted with fresh benzene to remove dissolved dinitrobenzene product and nitric acid. This benzene can be recycled into the reaction system.

For a clearer understanding of the invention, the following specific example is given. This example is intended to be merely illustrative of the invention and not in limitation thereof. Unless otherwise specified, all parts are by weight.

*Example*

In this example, the nitration was carried out in two stages. Two reaction vessels were used, and each was equipped with a cooling coil, an agitator, and an overflow arm. The overflow arm of the first vessel was connected to a liquid-liquid separator. This separator also had an overflow arm which was connected to the second reaction vessel. This set-up provided for a continuous flow of material through the reaction system. As the reaction mass increased in the first reaction vessel, due to the introduction of benzene and mixed acid, this mixture overflowed to the separator where spent acid was removed and discarded. The organic phase was then passed through the overflow arm of the separator to the second reaction vessel where it was contacted with fresh mixed acid. The slurry of acid and nitrobody in this second reaction vessel was then passed to a filter through the overflow arm of the vessel. The filter removed the nitrobody from the acid, and the acid was recycled to the first reaction vessel.

The reaction is highly exothermic (64 Kcal./mol.) and cooling was used to maintain the reaction vessel at 34° C.–36° C. throughout the operation. The operation was started by filling the system with synthetic mixtures approximating the composition of equilibrium operation. The system is filled with these mixtures, then all the feed and recirculation pumps may be turned on and the true operating equilibrium quickly established.

The first reactor stage and separator were filled with 1.5 parts mononitrobenzene, 0.5 part dinitrobenzene, and 7.5 parts spent acid (80 wt. percent $H_2SO_4$ and 20 wt. percent $H_2O$).

The second stage reactor was filled with 1 part dinitrobenzene and 4 parts spent acid (10 wt. percent $HNO_3$, 85 wt. percent $H_2SO_4$, and 5 wt. percent $H_2O$).

These mixtures were agitated to initiate the reaction. Benzene was then fed to the first reaction vessel at the rate of 5 parts by volume per minute. Acid from the second reaction vessel (of the following composition by weight: 10% $HNO_3$, 85% $H_2SO_4$, and 5% $H_2O$) was also supplied at the rate of 20 parts by volume per minute. When the level in the reaction vessel reached the overflow arm, the nitrobody and spent acid overflowed to the continuous separator. The spent acid was drawn off the bottom of the separator of the first stage, and it was extracted with benzene to remove dissolved nitrobody and then discarded. The nitrobody in the separator of the first stage overflowed to the second reaction vessel. Fresh acid composed of (on a weight basis) 20% $HNO_3$, 75% $H_2SO_4$, and 5% $H_2O$ was fed to the second reactor at 20 parts by volume per minute. The nitrobody and spent acid from this reactor overflowed to a filter to remove the solid dinitrobenzene from the spent acid. The spent acid from the second reaction vessel was introduced into the first reaction vessel at a rate of 20 parts by volume per minute. Any mononitrobenzene which came through the reaction system passed through the filter and was returned along with the spent acid to the first reaction vessel. The operation was run continuously for a period of 6 hours, and during this period there was a 99% conversion of benzene. A white dinitrobenzene product was obtained having a freezing point of 85° C. and a meta isomer content of 90%. This was repeated several times with freezing points of 84.5–85.5° C. and isomer content of 89–93% meta.

It is considered to be apparent from the above example that the reaction of the present invention can be carried out in any number of types of conventional apparatus. The example used two reaction vessels interconnected by a liquid-liquid separator between first and second reaction vessels and a liquid-solid separator on the return from the second to the first reactor. Other equipment which could be used includes a pipe line reactor set up in a similar manner to the reaction vessels of the example, assuming sufficient heat could be removed. A cascade reactor or baffled countercurrent extractors could be used.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

We claim:

1. A multi-stage nitration process for the preparation of meta-dinitrobenzene which comprises reacting at 5–40° C. benzene and a mixed acid of the following composition by weight: 60–85% sulfuric acid, 2–30% nitric acid, and 5–25% water, separating the spent acid from the nitrobody formed as a result of the reaction, and then further reacting the nitrobody at least once and at temperatures of from 5–40° C. with a mixed acid of the following composition by weight: 50–90% sulfuric acid, 10–50% nitric acid, and 0–15% water, the volume ratio of acid to nitrobody being in the range of 3:1 to 8:1, thus forming meta-dinitrobenzene in a slurry in unreacted acid, and recovering said meta-dinitrobenzene from said unreacted acid.

2. A multi-stage nitration process for the preparation of meta-dinitrobenzene which comprises reacting at 5–40° C. benzene and a mixed acid of the following composition by weight: about 85% sulfuric acid, about 10% nitric acid, about 5% water, separating the spent acid from the nitrobody formed as a result of the reaction, and then further reacting the nitrobody at least once and at temperatures of from 5–40° C. with a mixed acid of the following composition by weight: about 75% sulfuric acid, about 20% nitric acid, and about 5% water, the volume ratio of acid to nitrobody being in the range of about 4:1, thus forming meta-dinitrobenzene in a slurry in unreacted acid, and recovering said meta-dinitrobenzene from said unreacted acid.

3. A continuous, two-stage nitration process for the preparation of meta-dinitrobenzene which comprises continuously introducing into a reaction vessel at 5–40° C. benzene and a mixed acid of the following composition by weight:

60–85% $H_2SO_4$
2–30% $HNO_3$
5–25% water continuously removing a mixture of spent acid and nitrobody from said vessel, continuously separating spent acid from the nitrobody, and continuously passing in a second reaction vessel the separated nitrobody and mixed acid of the following composition by weight:

50–90% $H_2SO_4$
10–50% $HNO_3$
0–15% water the volume ratio of acid to nitrobody being in the range of 3:1 to 8:1, thus forming meta-dinitrobenzene in a slurry of unreacted acid, and continuously recovering said meta-dinitrobenzene from said unreacted acid.

References Cited by the Examiner

UNITED STATES PATENTS 2,643,271   6/53   Taylor et al. _____ 260—645

CARL D. QUARFORTH, *Primary Examiner*,

OSCAR R. VERTIZ, *Examiner*.